United States Patent [19]

Takata et al.

[11] Patent Number: 5,280,597
[45] Date of Patent: Jan. 18, 1994

[54] PIPELINE PROCESSOR WITH SELF TIMED DATA TRANSFER

[75] Inventors: Hidehiro Takata; Yoshihiro Seguchi; Hisakazu Sato; Shinji Komori, all of Itami, Japan

[73] Assignee: Mitsubishi Denki Kabushiki Kaisha, Tokyo, Japan

[21] Appl. No.: 676,668

[22] Filed: Mar. 28, 1991

[30] Foreign Application Priority Data

Mar. 30, 1990 [JP] Japan .................................. 2-86271
Jul. 23, 1990 [JP] Japan .................................. 2-195140

[51] Int. Cl.⁵ ...................... G06F 13/00; G06F 13/42; G11C 19/00
[52] U.S. Cl. .................................. 395/425; 395/250; 364/DIG. 1; 364/231.8; 364/948.34; 364/964.26; 365/189.05
[58] Field of Search ............. 395/425, 200, 250; 364/DIG. 1, 231.8, 948.34, 964.26; 365/189.05

[56] References Cited

U.S. PATENT DOCUMENTS

| | | |
|---|---|---|
| 4,438,492 | 3/1984 | Harmon, Jr. et al. ............... 364/200 |
| 4,674,032 | 6/1987 | Michaelson ..................... 364/DIG. 1 |
| 4,839,801 | 6/1989 | Nicely et al. ..................... 364/200 |
| 4,882,704 | 11/1989 | Komuri et al. ................. 364/DIG. 2 |
| 4,980,851 | 12/1990 | Komori et al. ................. 364/DIG. 2 |
| 5,019,967 | 5/1991 | Wheeler et al. ..................... 364/200 |
| 5,040,107 | 8/1991 | Duxbury et al. .................... 364/200 |
| 5,115,496 | 5/1992 | Nomura ........................... 395/250 |
| 5,117,490 | 5/1992 | Duxbury et al. .................... 364/200 |
| 5,121,480 | 6/1992 | Bonke et al. ................. 364/DIG. 1 |
| 5,158,529 | 9/1992 | Ueda et al. ................... 364/DIG. 1 |

OTHER PUBLICATIONS

IEEE Journal of Solid State Circuits, vol. 25, No. 1, Feb. 1990 pp. 95–99, Takata et al.
Digest of Technical Papers, 1989 Symposium on VLSI Circuits, pp. 123–124, Takata et al.

*Primary Examiner*—Alyssa H. Bowler
*Attorney, Agent, or Firm*—Townsend and Townsend Khourie and Crew

[57] ABSTRACT

An improved self-timed pipeline processor is provided with self-timed data transfer, thereby making it possible to control exclusively the memory reading and memory writing accesses of individual pipeline stages. The self-timed pipeline processor prohibits memory reading during memory writing and vice versa. In addition, the pipeline processor temporarily prevents the transfer of data to a next-accessing pipeline stage when the memory address presently being accessed is the same as the address to be accessed next, thereby preventing malfunction of the processor.

5 Claims, 10 Drawing Sheets

PIPELINE PROCESSOR WITH SELF TIMED DATA TRANSFER

BACKGROUND OF THE INVENTION

1. Field of the Invention

This invention relates to a self-timed pipeline processor designed to access a memory by pipelining.

2. Description of the Related Art

A pipeline processor is one kind of computer architecture. The pipeline processor has a close resemblance in concept to the assembly line where workers do respective operations in each block. As for the pipeline processor, operations or the like are processed in parallel in each block, namely, in each pipeline stage thereby achieving high-speed data processing. A self-timed pipeline processor is one of the pipeline processors of this type.

Figure 1:
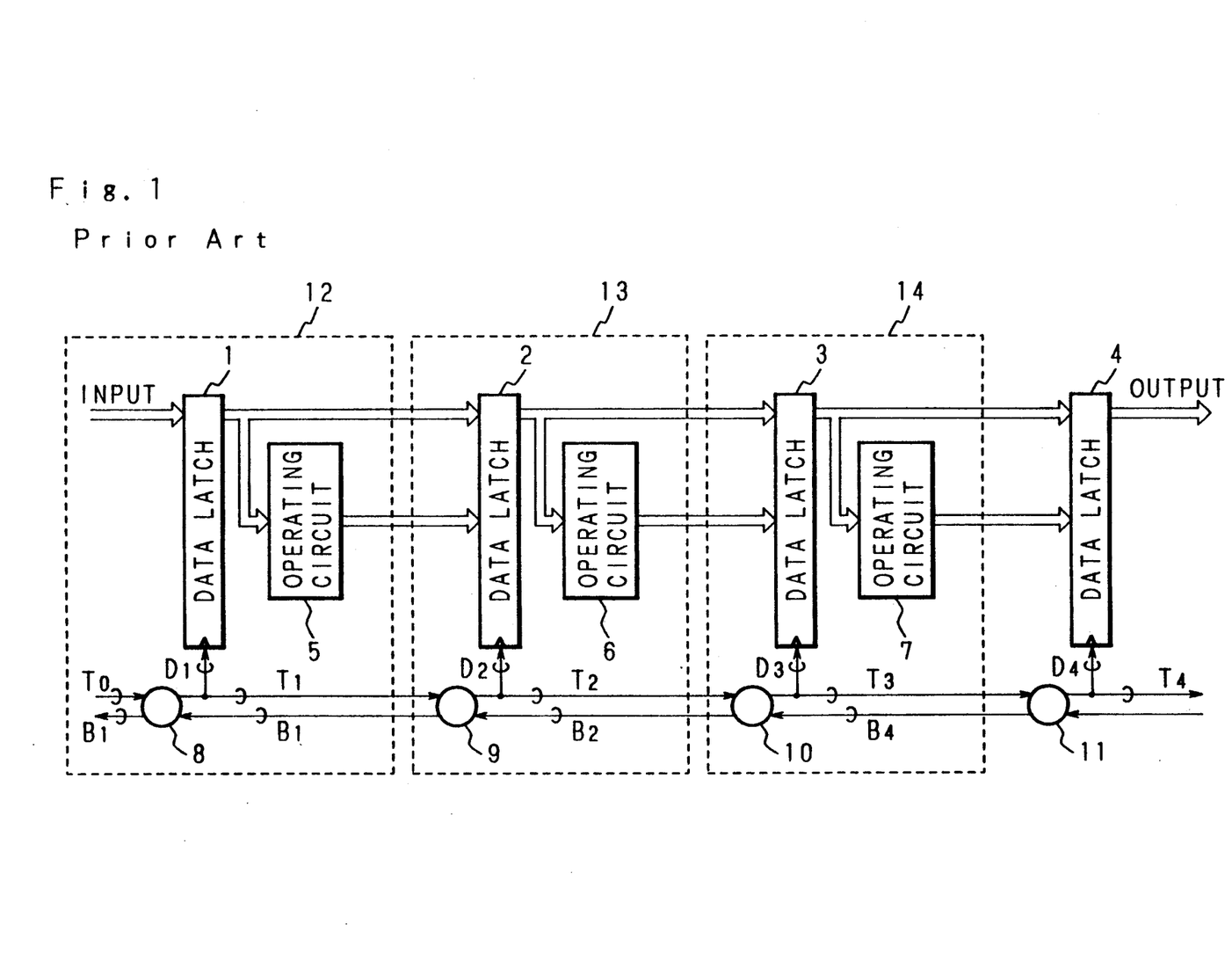
FIG. 1 is a block diagram showing the structure of a conventional pipeline processor.

FIG. 1 is a block diagram of a conventional self-timed pipeline processor, wherein numerals 1 through 4 represent data latch circuits, numerals 5 through 7 represent operating circuits for operating the data latched in the data latch circuits 1 through 4, and numerals 8 through 11 represent transfer control circuits for controlling the transfer of data between the data latch circuits. A numeral 12 designates a pipeline stage A consisting of the data latch circuit 1, transfer control circuit 8 and operating circuit 5, a numeral 13 designates a pipeline stage B consisting of the data latch circuit 2, transfer control circuit 9 and operating circuit 6, and a numeral 14 designates a pipeline stage C consisting of the data latch circuit 3, transfer control circuit 10 and operating circuit 7. T0 through T4 denote data transfer demanding signals for demanding the succeeding pipeline stage to permit the transfer of the data to a data latch circuit thereof. B1 through B4 denote data transfer permitting signals for indicating the data latch circuit in the succeeding pipeline stage is vacant, that is, able to accept the data from the preceding pipeline stage. D1 through D4 denote latch controlling signals having the same output logical values as the corresponding signals T1 through T4. When the latch controlling signal is active, the data inputted to each of the data latch circuits 1 through 4 is latched (the inputted data is determined). As for the transfer control circuits 8 through 11, a transfer control circuit disclosed in Japanese Patent Application Laid-Open No. 63-204355 (204355/1988) may be employed.

In the conventional pipeline processor of the aforementioned structure, assuming that the data is inputted from the preceding pipeline stage (not shown) to the pipeline stage A 12, when the permitting signal B1 is active, the demanding signal T1 turns active thereby turning the latch controlling signal D1 active with the same timing. Accordingly, the data is latched by the data latch circuit 1. Then, the demanding signal T1 is outputted to the transfer control circuit 9. T1 is the data transfer demanding signal for outputting the data latched in the data latch circuit 1 to the next pipeline stage B 13, and B2 is the data transfer permitting signal which turns active when the data is able to be latched by the data latch circuit 2 in the next pipeline stage B 13. When the permitting signal B2 turns active, the data is inputted from the pipeline stage A 12 to the data latch circuit 2 of the pipeline stage B 13. In other words, the data is transferred from the data latch circuit 1 to the data latch circuit 2. In the manner as described above, the data is transferred between the data latch circuits 1 and 2 while the transfer control circuits 8, 9 communicate with each other by the signals T1 and B1. The data read out from a memory (not shown) reaches the data latch circuit 1 of the pipeline stage A 12 thereby being latched, and against some bits of the latched data, for example, a logical operation is performed in the operation circuit 5. The data read out from the memory includes an instruction code for carrying out the operation and an operand necessary for the logical operation, which are taken out from the data latch circuit 1 to carry out the operation in the operation circuit 5. The operation result is outputted to the data latch circuit 2 of the next pipeline stage B 13 while the remaining bits without being used for the operation are outputted to the data latch circuit 2. Similarly, the operation is conducted in the operation circuit 6 of the pipeline stage B 13, the result of which is outputted to the data latch circuit 3 of the pipeline stage C 11. After the data read out from the memory is processed in each of the operation circuits 5, 6, 7 of the respective pipeline stages as described hereinabove, the result is written into a memory or outputted to the other peripheral circuit. That is, the data is transferred from the left to the right of the pipeline stages.

In the above-described structure of the conventional self-timed pipeline processor, when accessing the memory by using pipeline stages for the purpose of high-throughput, since the data are processed in parallel by pipeline stages, the reading of the data from the memory and the writing of the data therefrom may be disadvantageously overlapped.

Moreover, in the case where the continuous inputted data access the same address of the memory when the memory accesses are rushing, it may cause a malfunction of the pipeline processor. This is because in the conventional processor the memory reading is performed prior to the memory writing and therefore, the memory reading by the following data is processed before the memory writing by the preceding data is finished, and the proper data to be read out by the preceding data is not read out.

SUMMARY OF THE INVENTION

This invention has been devised to solve the aforementioned disadvantages inherent in the prior art A first object of this invention is to provide a pipeline processor wherein a reading pipeline stage is controlled exclusively from a writing pipeline stage, so that the reading of data from a memory is prohibited during the writing period thereof into the memory.

A second object of this invention is to provide pipeline processor wherein a reading pipeline stage is controlled exclusively from a writing pipeline stage, so that memory reading during memory writing or memory writing during memory reading is prohibited.

A third object of this invention is to provide a pipeline processor wherein the transfer of data to a pipeline stage which accesses next is temporarily stopped when the address of the memory now in access coincides with an address of the next access, thereby preventing a malfunction of the processor.

The above and further objects and features of the invention will more fully be apparent from the following detailed description with accompanying drawings.

DESCRIPTION OF THE PREFERRED EMBODIMENTS

Now, a pipeline processor of this invention will be discussed more in detail with reference to the accompanying drawings.

Figure 2:
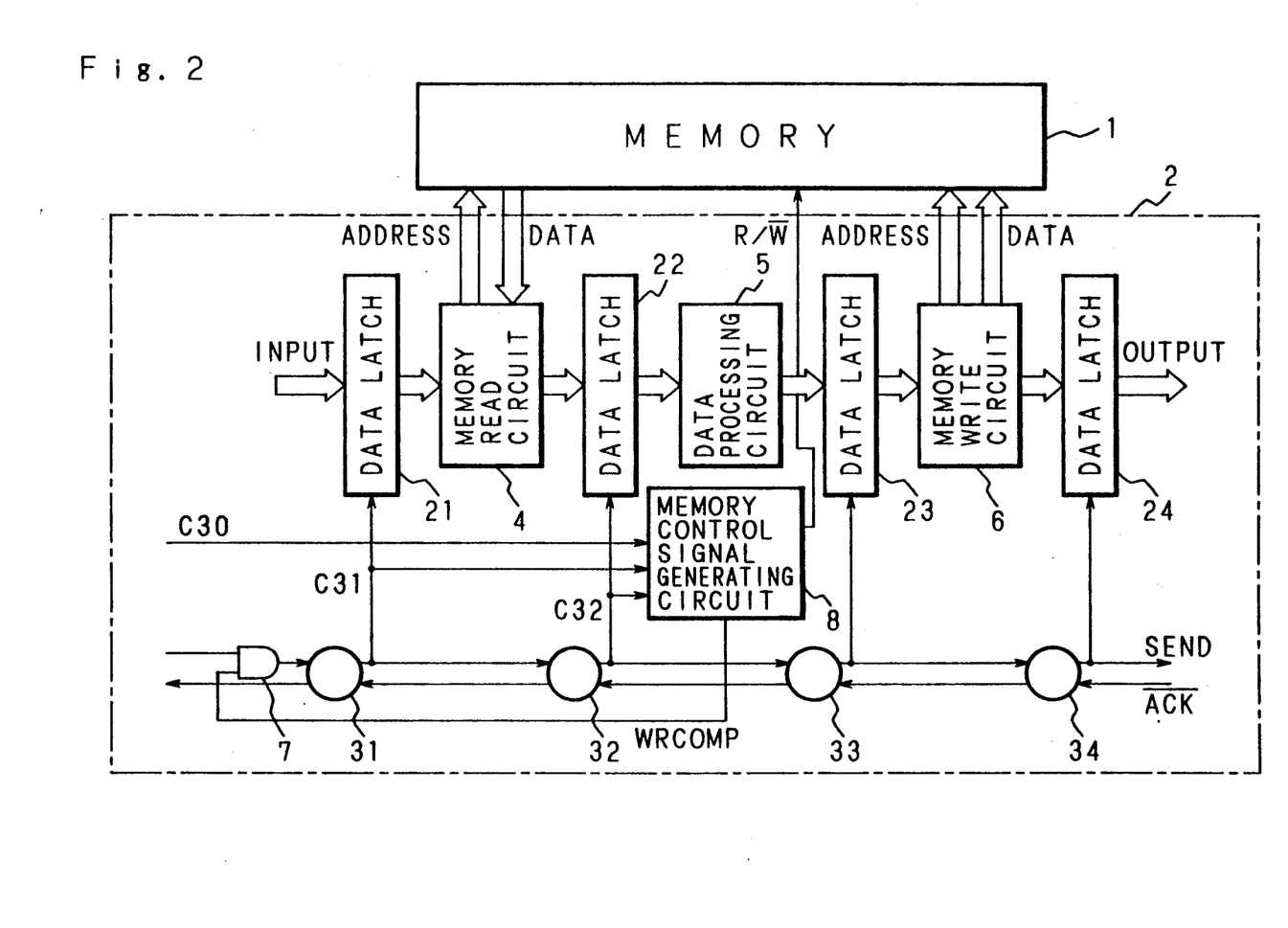
FIG. 2 is a block diagram showing the structure of a pipeline processor according to a first embodiment of this invention.

FIG. 2 is a block diagram showing the structure of a pipeline processor according to a first embodiment of this invention. In the figure, a numeral 2 designates the pipeline processor.

A memory 1 includes a general memory wherein the memory reading/memory writing is controlled by an R/W̄ signal, and a multiplexer to switch the reading/writing of an address and data. In other words, when the R/W̄ signal is "1", the data is read out from the specified address, and when the R/W̄ signal is "0", the data is written into the specified address.

According to the embodiment, for subdividing a sequence of operation into three pipeline stages, data latches 21 through 24 are provided to temporarily store the intermediate results and data not yet processed in the pipeline stages are, respectively. Accordingly, the bit width for each data latch necessitates the width corresponding to the number of bits of the intermediate result and the not-yet-processed data.

Figure 6:
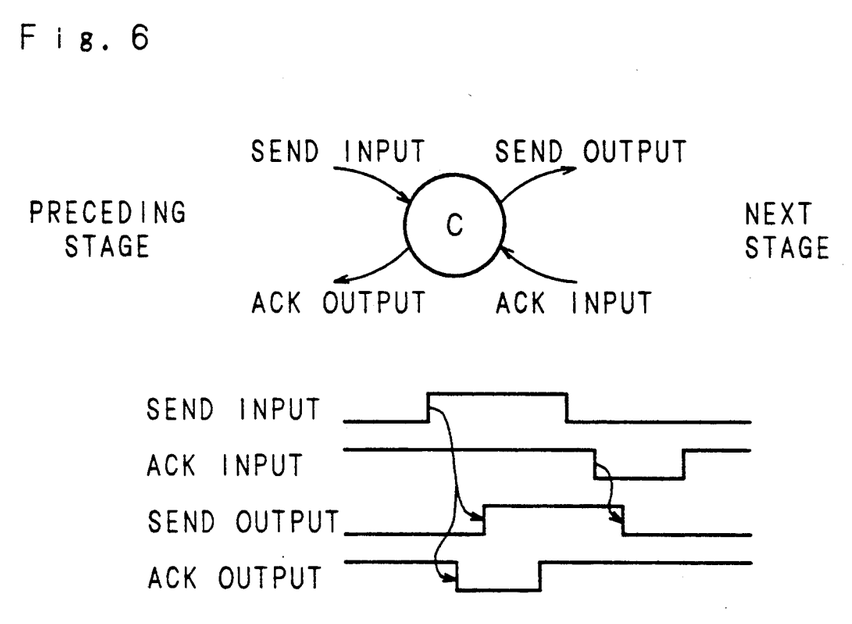
FIG. 6 is a diagram and a timing chart explanatory of the principle of control of the data transfer through handshaking.

Transfer control circuits 31 through 34 control the transfer of data between the data latch circuits in a self-timed manner through exchange of handshaking signals between the data latch circuits. The principle of the data transfer through handshaking will be understood from a diagram and a timing chart of FIG. 6. More specifically, only when a SEND INPUT signal for demanding the data transfer inputted from the preceding stage is active and an ACK OUTPUT signal for indicating the vacancy of the stage outputted to the preceding stage is active, a SEND OUTPUT signal for demanding the data transfer outputted to the succeeding stage is made active. At this time, an ACK INPUT signal inputted from the succeeding stage is disabled to show the busy condition. This condition returns to the active condition after the native delay time of the transfer control circuit passed. Thus, the data latches 21 through 24 are controlled by the SEND signals outputted from the respective transfer control circuits 31 through 34, whereby the data is transferred in a self-timed manner. The detail of the transfer control circuits is disclosed in Japanese Patent Application No. 62-36551 (36551/1987), now U.S. Pat. No. 4,882,704.

A memory reading circuit 4 takes out a necessary readout address from outputs of the data latch 21, and supplies the same to the memory 1. At the same time, the memory reading circuit 4 inputs the data read out from the memory 1 to the data latch 22.

A data processing circuit 5 processes the data read out from the memory 1, for example, in the case of a functional memory performing read, modify and write, a process corresponding to the modification is conducted in the circuit 5. In the case of a matching memory, the data read out in the circuit 5 is compared with the inputted data.

A memory writing circuit 6 takes out a necessary write-into address and data from outputs of the data latch 23 and supplies the same to the memory 1.

A logical gate 7 is an AND gate with two input terminals.

A memory control signal generating circuit 8 generates an R/W̄ signal to control the memory reading/memory writing and also a WRCOMP signal to prohibit memory reading during memory writing.

Figure 3:
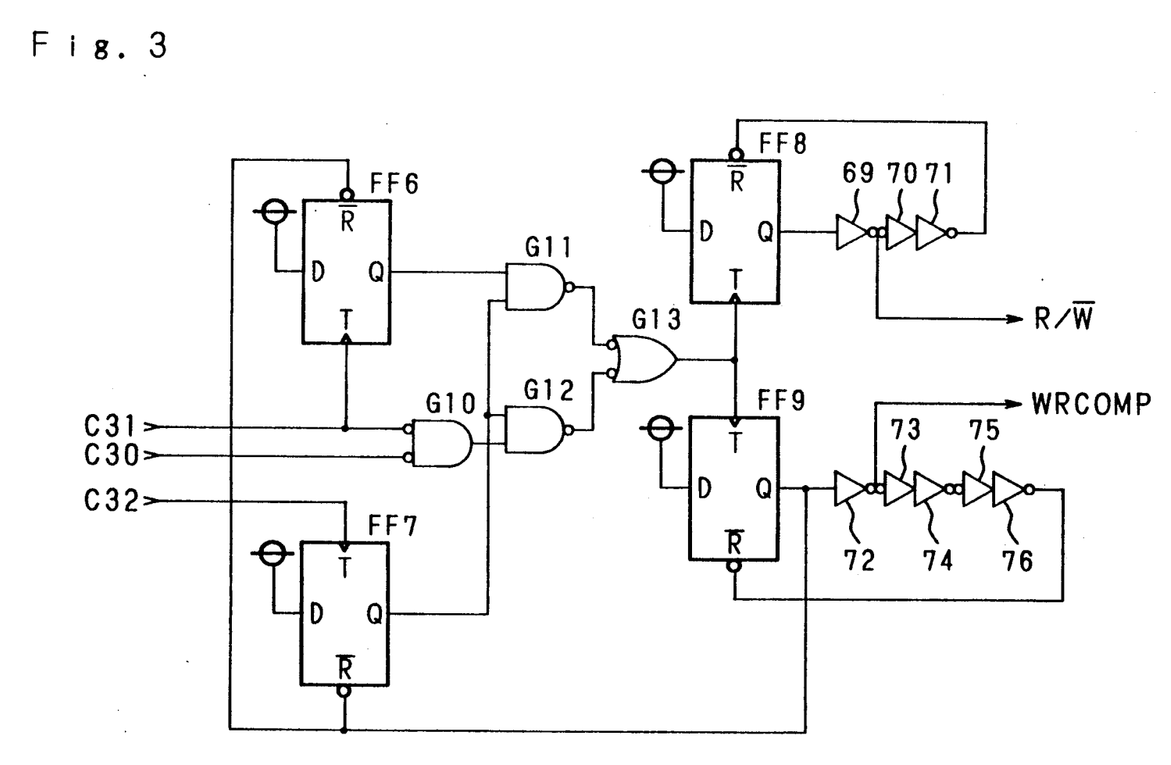
FIG. 3 is a circuit diagram of a memory control signal generating circuit of the processor of FIG. 2.

A circuit diagram of the memory control signal generating circuit 8 is indicated in FIG. 3. As shown in FIG. 3, C30 through C32 are input signals to the generating circuit 8, while R/W̄ and WRCOMP are output signals from the circuit 8. The R/W̄ and WRCOMP signals are normally high ("H") (reading). The R/W̄ and WRCOMP signals are low ("L"), that is, the writing is permitted, when C32 is "H" and C30, C31 are "L", or both C31 and C32 are "H". In other words, it is when C32 is active ("H") and, only the write-into pipeline stage is operating whereby the data inputted into the data latch 21 is latched from which outputted a write-into address and the operating result to the memory 1. Or, it is when the data transfer is demanded to both a data processing pipeline stage and a write-into pipeline stage, that is C31 is turned active ("H") thereby the inputted data in the data latch 22 being latched and operating in the data processing circuit 5 while the WRCOMP signal is not generated, and further C32 is turned active thereby the inputted data in the data latch 23 being latched and the latched data which is, the calculated result being written into the memory 1.

In either of the above two cases, the data is written into the memory 1. When C32 is "H" and C30, C3l are "H", an output from a gate G13 is "H" which is inputted to each clock input pin (T) of flip-flops FF8, 9 as "H" clock. Then, each output pin (Q) of the flip-flops FF8,9 turns "H", thereby to turn the R/W̄ signal "L" through a logical element 69 and the WRCOMP signal "L" through a logical element 72. The low R/W̄ signal is inputted to the memory 1. The address inputted to the memory 1 is decided by this R/W̄ signal as to whether it is a write-into address or a read-out address. That is, when the R/W̄ signal is "H", the address is for reading out, and when the R/W̄ signal is "L", for writing into. The WRCOMP signal in the low level is outputted to the logical gate 7 which is an AND gate with two input terminals. An output signal of the logical sate 7 is forcibly turned to be "L" and is outputted to the transfer control circuit 31. Since the input signal to the transfer control circuit 31 of the read-out pipeline stage is "L", the data is not latched in the data latch 21. Accordingly, the data is not read out from the memory 1 in the readout pipeline stage. In the manner as above, as the operation of the read-out pipeline stage is prohibited, the writing to the memory 1 is carried out in the write-into pipeline stage. The R/W and WRCOMP signals return to the normal state after a native delay time of the logical elements 69 through 76 connected to the flip-flops FF8,9 passed.

In the meantime, the number of logical elements 69 through 71 connected to the flip-flop FF8 is different from that of logical elements 72 through 76 connected to the flip-flop FF9. Therefore, the "L" period of the R/W signal is rendered longer than that of the WRCOMP signal, which is necessitated for gaining time to convert the read-out address to a write-into address when the R/W signal is changed from "H" to "L", thereby making the writing into the memory 1 perfect.

However, if the width of a oneshot pulse of the WRCOMP signal is extremely wide the rate of the data transfer is undesirably lowered.

Figure 4:
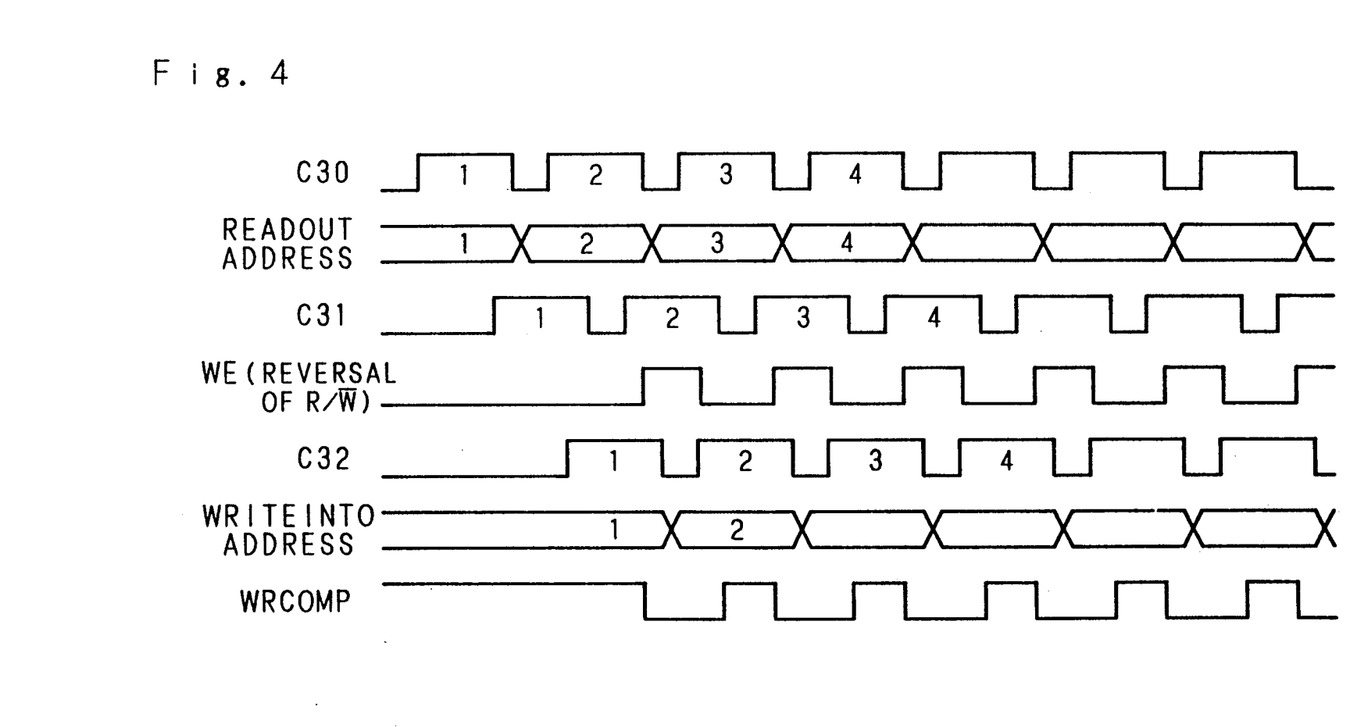
FIG. 4 is a timing chart of reading/writing of the processor of FIG. 2.

Because of the above-described structure, it becomes possible to exclusively control the reading/writing by a pipelined memory access. FIG. 4 is a timing chart of the reading/writing.

Another embodiment of this invention will be discussed hereinbelow with reference to the corresponding drawings.

Figure 5:
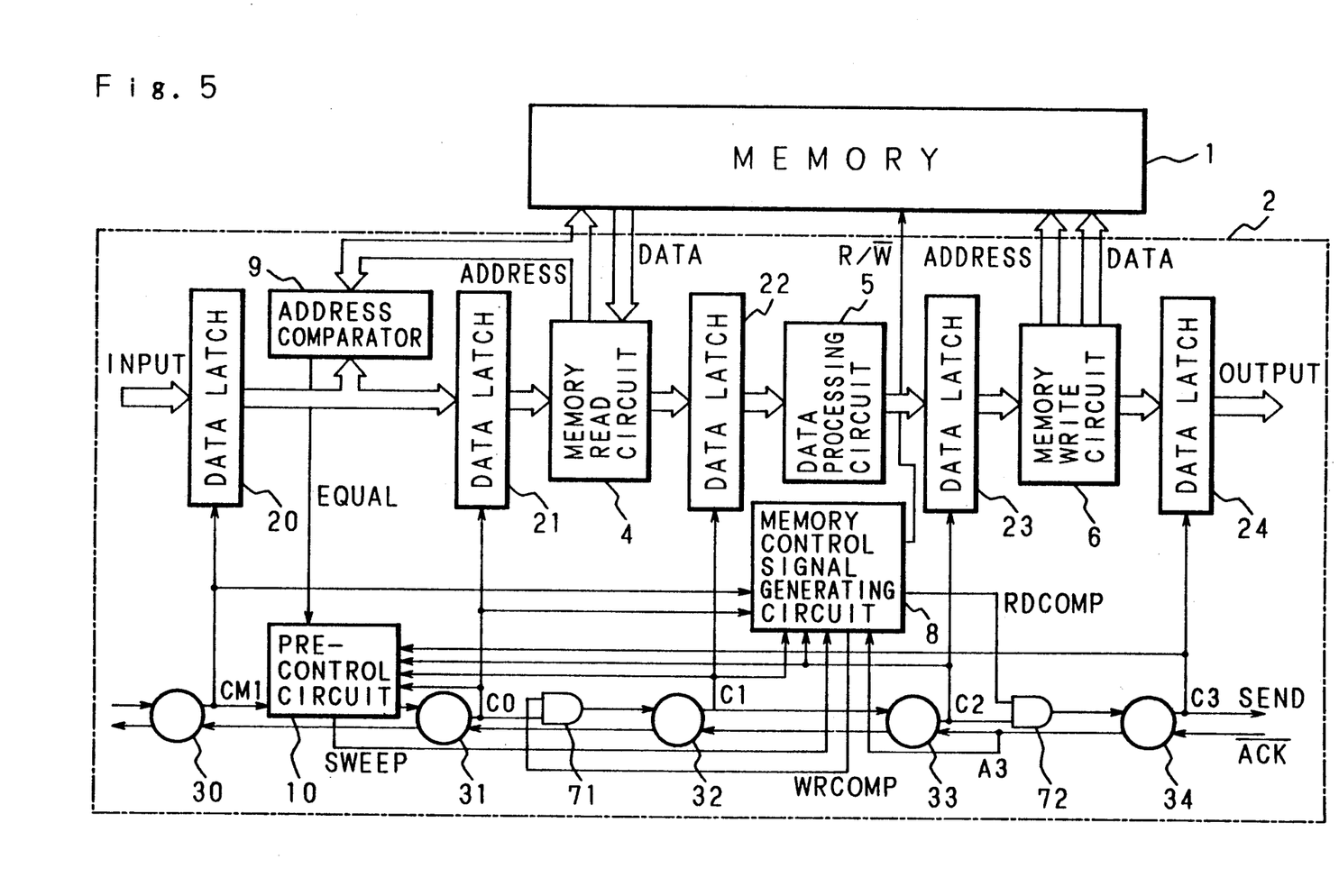
FIG. 5 is a block diagram showing the structure of a pipeline processor according to a second embodiment of this invention.

Referring to a block diagram of FIG. 5 showing a pipeline processor according to the embodiment. A memory 1 includes a switching multiplexer between reading and writing of an address and data, and a general memory wherein the memory reading/memory writing is controlled by the R/W signal. When the R/W signal is "1", the data stored in the specified address is read out. On the other hand, when R/W signal is "0", the data is written into the specified address.

Data latches 20, 21, 22, 23 are provided to temporarily store the intermediate results of the procedure and the data not yet processed in the respective pipeline stage for subdividing a sequence of the procedure into four pipeline stages in the instant embodiment. Therefore, the hit width of each data latch corresponding to the intermediate result and the not-yet-processed data is necessary for each stage.

Transfer control circuits 30 through 34 control the data transfer between the data latch circuits in a self-timed manner, similar to the above first embodiment, by handshaking signals, i.e., SEND and ACK.

A memory reading circuit 4 takes out a necessary readout address from outputs of the data latch 21, and inputs the same to the data latch 22.

A data processing circuit 5 processes the data read out from the memory 1. For example, in the case of a functional memory performing read, modify and write, a process corresponding to the modification is performed in this circuit 5. In the case of a matching memory, the data read out in this circuit 6 is compared with the inputted data.

A memory writing circuit 6 takes out a necessary write-into address and data from outputs of the data latch circuit 23 and feeds the same to the memory 1.

Each logical gate 71,72 is an AND gate of two inputs. A SEND signal from the transfer control circuits 31,33 is input to a first input terminal of each gate, while a WRCOMP signal and a RDCOMP signal generated in a memory control signal generating circuit 8 are inputs to a second input terminal of each gate.

Figure 7A:
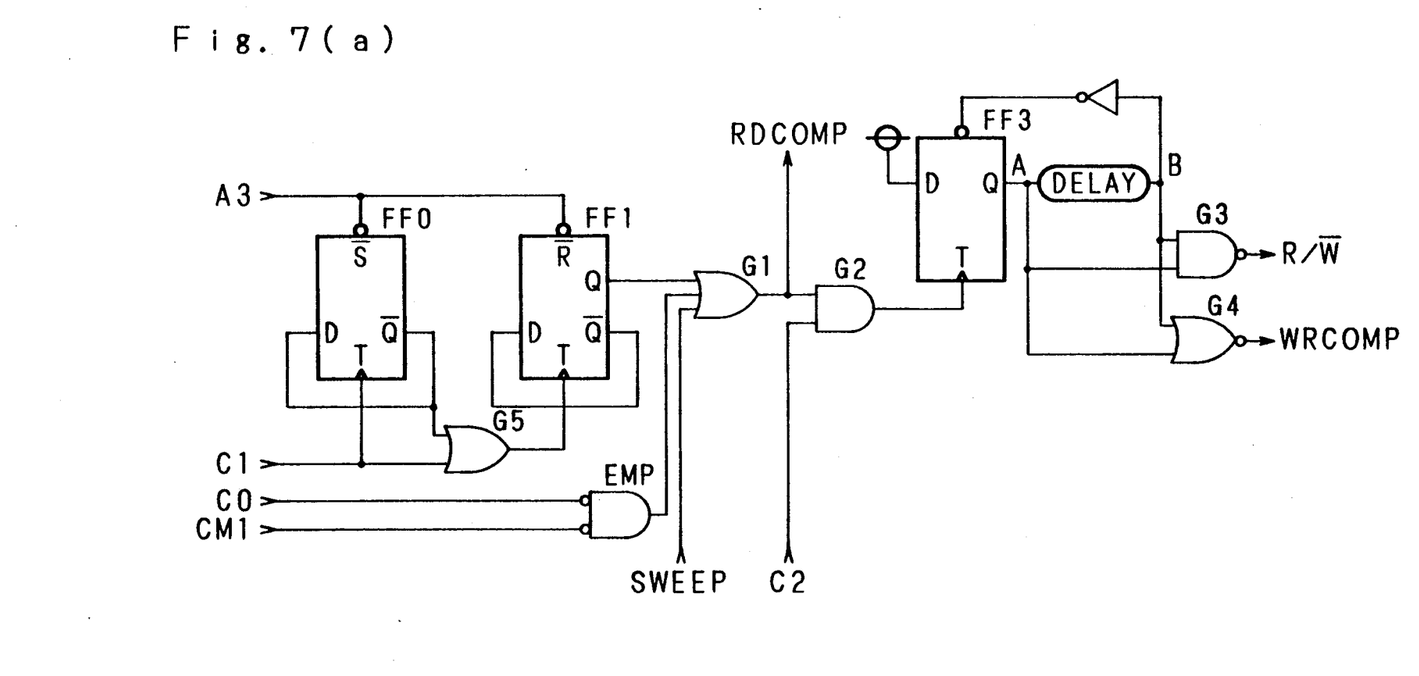
FIGS. 7(a) and 7(b) circuit diagram and a timing chart of a memory control signal generating circuit of the processor of FIG. 5.
Figure 7B:
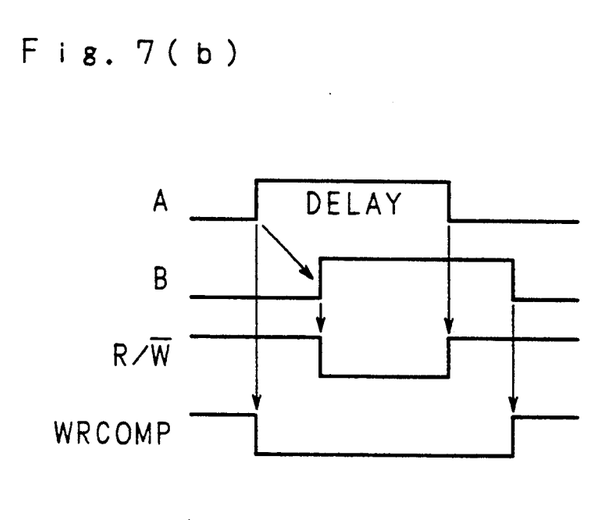

The aforementioned memory control signal generating circuit 8 generates the R/W signal for controlling the memory reading/memory writing, and also the WRCOMP signal for prohibiting memory reading during memory writing and the RDCOMP signal for prohibiting memory writing during memory reading. The structure of the memory control signal generating circuit 8 is illustrated in a circuit diagram of FIG. 7(a). FIG. 7(b) shows a timing chart. Although the R/W signal is normally "1" where the processor is in the reading state, a "0" oneshot pulse is generated only when some condition is met. The oneshot pulse is generated by a flip-flop FF3 and a delay element DELAY. The width of the one-shot pulse can be adjusted by changing the delay time of the delay element DELAY. The one shot pulse is generated when an output of an AND gate G2 with two input terminals is changed from "0" to "1". That is, any one of the inputs of an OR gate G1 with three input terminals is changed to "1" and moreover a SEND signal C2 of the transfer control circuit 33 is changed to "1".

To the OR gate G1 with three input terminals are inputted a SWEEP signal generated in a pre-controlling circuit 10, an EMP signal which becomes "1" when both latch control signals CM1, C0 of the data latches 20, 21, are "0", and an output from the flip-flop FF1. The flip-flops FF0, FF1 and an OR gate G5 with two input terminals constitute a 2-bit counter which counts the changing number of times of the SEND signal C1 of the transfer control circuit 32 from "0" to "1". Accordingly, when an output of the flip-flop FF1 is changed to "1", it means that two data pass the transfer control circuit 32. Moreover, since the SEND signal C1 of the transfer control circuit 32 is a latch control signal for the data latch 22 where the readout result from the memory 1 is latched, the change of the signal C1 from "0" to "1" represents that the data read out from the memory 1 is latched by the data latch 22, thereby completing the memory reading. As a result, an output from the OR gate G1 with three input terminals is inputted as a RDCOMP signal to the AND gate 72 with two inputs arranged on the signal line of the SEND signal outputted from the transfer control circuit 33.

So long as both of the EMP signal and SWEEP signal are not "1", the data transfer from the transfer control circuit 33 to the data transfer control circuit 34 is not conducted until the flip-flop FF1 is changed to "1". Immediately before the flip-flop FF1 is changed from "0" to "1", the data is waiting in the data transfer control circuit 33. As soon as the next data reaches the transfer control circuit 32, the RDCOMP signal changes from "0" to "1", so that the output from the logical gate 72 changes to "1" which enables the data being transferred from the circuit 33 to the circuit 34. When the data is transferred to the transfer control circuit 34, an acknowledging signal of data receiving ACK of 0 pulse is transmitted from the circuit 34 to the circuit 33. The flip-flop FF0 is set and the flip-flop FF2 is reset by this ACK signal. Accordingly, the 2-bit counter which counts the changing number of the signal C1 is set with "1", indicating that the data passing through the transfer control circuit 32,is one.

At the time when the RDCOMP signal changes from "0" to "1" and both the EMP and SWEEP signals are "0", the data is waiting in the transfer control circuit 32, and therefore the C2 inputted to the other input terminal of the AND gate G2 is "1". Accordingly, an input to a T (trigger) terminal of the flip-flop FF3 immediately changes from "0" to "1", and a NAND gate G3 with two input terminals generates an R/W̄ signal of "0" oneshot pulse while a NOR gate G4 with two input terminals generates a WRCOMP signal of "0" oneshot pulse including the "0" oneshot Pulse of the R/W̄ signal.

In the case where the EMP signal indicating that no data is following or the SWEEP signal generated in the precontrolling circuit 10 is "1". the RDCOMP signal is changed to "1" irrespective of the counting result of the signal C1, and the signal C2 changes from "0" to "1", whereby the R/W̄ and WRCOMP signals are generated.

An address comparator 9 compares an address of the memory to be accessed by data sent to the transfer controlling circuit 30 with an address which the preceding data of the above data has accessed. In the case where the addresses are found same from the comparison, the address comparator 9 outputs an EQUAL signal of "1".

Figure 8:
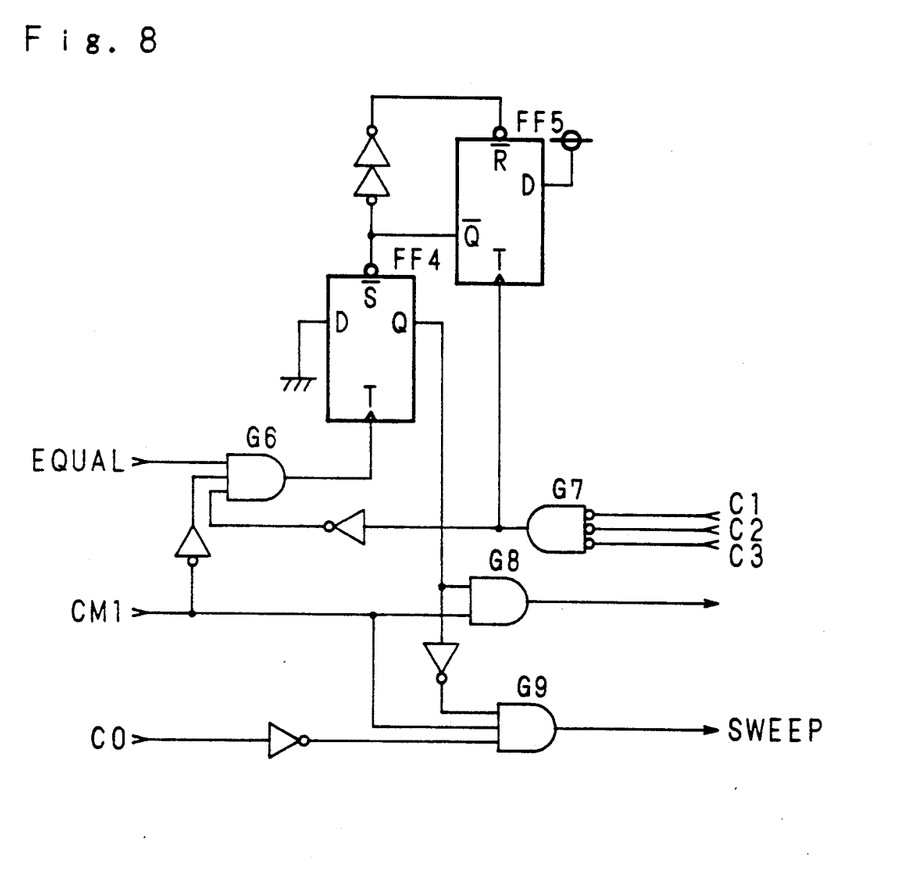
FIG. 8 is a circuit diagram of a pre-control circuit of the processor of FIG. 5.

When the addresses of the data transferred to the transfer controlling circuit 30 and the preceding data are determined equal by the address comparator 9, and at the same time memory writing of the preceding data is not finished, a pre-controlling circuit 10 temporarily stops the transfer of the data until the preceding data is completely written into the memory. FIG. 8 shows a circuit diagram of the pre-controlling circuit 10. When an input to the T terminal is changed from "0" to "1", an output from the flip-flop FF4 becomes "0", thereby temporarily stopping the transfer of the data from the circuits 30 to 31 by and AND gate 8 with two input terminals. A flip-flop FF5 again sets the flip-flop FF4 whose output changed to "0", thereby generating a "0" oneshot pulse to resume the data transfer.

Hereinafter, the condition of temporarily stopping the data transfer will be explained. That is, when all of the three inputs to an AND gate G6 with three input terminals are turned "1". More specifically, when an output of the address comparator 9 is "1" indicating that the addresses of the preceding data and the data going to access the memory 1 are the same, and when a SEND signal generated from the transfer control circuit 30 is "0" indicating that the data transfer from the circuits 30 to 31 is completed, and when an output of a NOR gate G7 with three input terminals is "0" indicating that the preceding data is present in any one of the transfer control circuits 32, 33 or 34, thus not completing the writing of the data the data transfer is temporarily stopped.

A condition to resume the data transfer is that an output of the NOR gate G7 is changed to "1". In other words, when the preceding data comes not to be present in any of the transfer control circuits 32, 33 or 34, which indicates that the data is completely written into the memory, the data transfer is started again.

Meanwhile, the SWEEP signal is generated in the precontrolling circuit 10 and inputted to the memory control signal generating circuit 8. Since the condition of memory writing is that two data has passed through the transfer control circuit 32, when the address of the preceding data is same as that of the succeeding data, the succeeding data is kept waiting in the transfer control circuit 30, and accordingly the preceding data is never written into the memory, but remains waiting in the circuit 33. In order to avoid this, the SWEEP signal is generated to enforce the writing and to prevent the data transfer from being stopped under the conditions as mentioned above. The SWEEP signal is generated when all the inputs to an AND gate G9 with three input terminals turn "1", that is, an output of the flip-flop FF4 is "0" thereby to stop the data transfer and the CM1 signal is "1" indicating that the data is positively stopped, and the SEND signal C0 from the transfer control circuit 31 turns "0" thereby the reading of the preceding data being completed.

Figure 9:
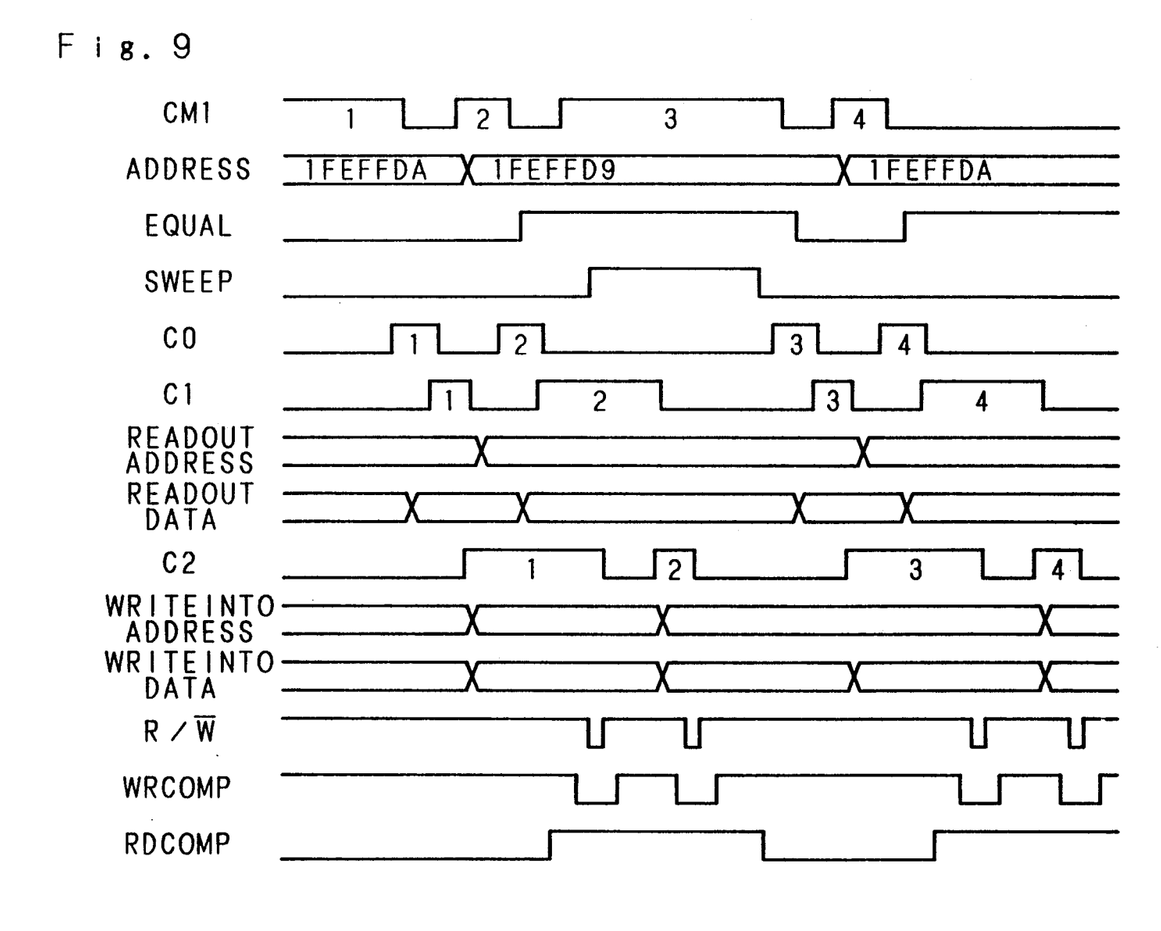
FIG. 9 is a timing chart of reading/writing of the processor of FIG. 5.

By the abovementioned structure, the reading/writing of the pipeline accessed memory can be controlled in an exclusive manner. FIG. 9 shows a timing chart of the reading/writing.

It is to be noted here that this invention may be modified using a Muller's C element by a four-cycle signal revealed in "Instruction to VLSI Systems" (pp. 280–283, 7th chapter; co-authored by C. Mead and L. Conway) for the transfer control circuits 33 through 37.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A self-timed pipeline processor having a plurality of pipeline stages, including at least a memory reading pipeline stage and a memory writing pipeline stage, the self-timed pipeline processor comprising:
   a plurality of data latches, one per pipeline stage, for temporarily storing data transferred from a preceding pipeline stage;
   a plurality of data transfer control circuits, one per each of said data latches, for generating control signals based on detecting the presence or absence of latched data at a preceding or succeeding pipeline stage and for providing an enable signal for controlling the input/output of data to and from its data latch;
   a memory reading circuit, which accesses the memory using a read address included in the output of the data latch for a memory reading pipeline stage, for reading data from the memory at said read address;
   a memory writing circuit, which accesses the memory using a write address included in the output of the data latch for a memory writing pipeline stage, for writing data to the memory at said write address;
   a memory control signal generating circuit which generates a first control signal for enabling memory reading or memory writing and a second control signal for prohibiting memory reading during memory writing, said memory control signal generating circuit receiving as input at least one of said control signals from at least one of said data transfer control circuits;
   means for stopping the transfer of data to said data latch for said memory reading pipeline stage upon receipt of said second control signal for prohibiting memory reading during memory writing.

2. A self-timed pipeline processor as set forth in claim 1, wherein said means is an AND gate receiving as a first input said second control signal for prohibiting memory reading during memory writing and receiving as a second input one of said control signals from said data transfer control circuits of said memory reading pipeline stage.

3. A self-timed pipeline processor having a plurality of pipeline stages, including at least a memory reading pipeline stage and a memory writing pipeline stage, the self-timed pipeline processor comprising:
- a plurality of data latches, one per pipeline stage, for temporarily storing data transferred from a preceding pipeline stage;
- a plurality of data transfer control circuits, one per each of said data latches, for generating control signals based on detecting the presence or absence of latched data at a preceding or succeeding pipeline stage and for providing an enable signal for controlling the input/output of data to and from its data latch;
- a memory reading circuit, which accesses the memory using a read address included in the output of the data latch for a memory reading pipeline stage, for reading data from the memory at said read address;
- a memory writing circuit, which accesses the memory using a write address included in the output of the data latch for a memory writing pipeline stage, for writing data to the memory at said write address;
- a memory control signal generating circuit, which generates a first control signal for enabling memory reading or memory writing, generates a second control signal for prohibiting memory reading during memory writing, and generates a third control signal for prohibiting memory writing during memory reading, said memory control signal generating circuit receiving as input at least one of said control signals from at least one of said data transfer control circuits;
- a first means for stopping the transfer of data to said data latch for said memory reading pipeline stage upon receipt of said second control signal for prohibiting memory reading during memory writing;
- a second means for stopping the transfer of data to said data latch for said memory writing pipeline stage upon receipt of said third control signal for prohibiting memory writing during memory reading.

4. A self-timed pipeline processor as set forth in claim 3, further comprising:
- a comparator for comparing a first memory address being accessed presently in a pipeline stage with a second memory address which a different pipeline stage will access next; and
- a circuit for stopping the transfer of data to a data latch of said different pipeline stage if said first and second memory addresses are the same.

5. A self-timed pipeline processor as set forth in claim 3, wherein said first means is an AND gate receiving as a first input said second control signal for prohibiting memory reading during memory writing and receiving as a second input one of said control signals from said data transfer control circuit of said memory reading pipeline stage, and wherein said second means is an AND gate receiving as a first input said third control signal for prohibiting memory writing during memory reading and receiving as a second input a control signal from said data transfer control circuit of said memory writing pipeline stage.

* * * * *